United States Patent
Wang et al.

(10) Patent No.: US 11,085,166 B2
(45) Date of Patent: Aug. 10, 2021

(54) COMPOSITE SLOTTING EQUIPMENT COMBINED STATIC PRESSURE AND VIBRATION OF POLYMER ANTI-SEEPAGE WALL AND USING METHOD THEREOF

(71) Applicants: WELEAD Infrastructure Engineering Technology (Zhengzhou), Ltd., Henan (CN); SAFEKEY Engineering Technology (Zhengzhou), Ltd., Henan (CN)

(72) Inventors: Fuming Wang, Henan (CN); Hongyuan Fang, Henan (CN); Peng Zhao, Henan (CN); Chengchao Guo, Henan (CN); Yanhui Pan, Henan (CN); Xianfeng Zhao, Henan (CN); Guobin Qiao, Henan (CN); Zhihui Jia, Henan (CN); Hui Liu, Henan (CN)

(73) Assignees: WELEAD Infrastructure Engineering Technology (Zhengzhou), Ltd., Henan (CN); SAFEKEY Engineering Technology (Zhengzhou), Ltd., Henan (CN)

( * ) Notice: Subject to any disclaimer, the term of this patent is extended or adjusted under 35 U.S.C. 154(b) by 0 days.

(21) Appl. No.: 16/856,061

(22) Filed: Apr. 23, 2020

(65) Prior Publication Data
US 2020/0248427 A1 Aug. 6, 2020

(30) Foreign Application Priority Data

Sep. 26, 2019 (CN) .......................... 201910919001.9

(51) Int. Cl.
*E02D 31/00* (2006.01)
*B09B 1/00* (2006.01)
(Continued)

(52) U.S. Cl.
CPC ............ *E02D 31/006* (2013.01); *B09B 1/006* (2013.01); *B66F 3/26* (2013.01); *E02D 3/046* (2013.01); *E02D 15/02* (2013.01); *E02D 19/16* (2013.01); *F15B 15/16* (2013.01); *E02D 2250/003* (2013.01)

(58) Field of Classification Search
CPC ....... E02D 31/006; E02D 15/02; E02D 19/16; E02D 2250/003; E02D 3/046; B09B 1/006; B66F 3/26; F15B 15/16
See application file for complete search history.

(56) References Cited

U.S. PATENT DOCUMENTS

| 3,416,322 | A | * | 12/1968 | Bodine ..................... E02D 5/20 405/267 |
| 2014/0270985 | A1 | * | 9/2014 | Maher et al. ........... E02D 3/054 405/271 |

* cited by examiner

*Primary Examiner* — Tara Mayo-Pinnock

(57) ABSTRACT

A pressing-pulling device includes: a pressing-pulling bracket, wherein slotting oil cylinders are symmetrically and vertically mounted on the pressing-pulling bracket, and a piston rod of each of the slotting oil cylinders faces downwardly; a bottom end of the piston rod is connected to a connecting plate, and a through-hole is provided in a middle of the connecting plate; a continuous lifting mechanism is installed in a middle of the pressing-pulling bracket, and a slotting rod is vertically inserted into the continuous lifting mechanism; a lifting ring is installed at a top end of the slotting rod; a bottom end of the slotting rod extends downwardly through the through-hole to connect to a slotting cutter; a locking device is fixed on the connecting plate near the through-hole for fixing the slotting rod.

9 Claims, 3 Drawing Sheets

(51) Int. Cl.
*B66F 3/26* (2006.01)
*E02D 15/02* (2006.01)
*E02D 19/16* (2006.01)
*E02D 3/046* (2006.01)
*F15B 15/16* (2006.01)

COMPOSITE SLOTTING EQUIPMENT COMBINED STATIC PRESSURE AND VIBRATION OF POLYMER ANTI-SEEPAGE WALL AND USING METHOD THEREOF

CROSS REFERENCE OF RELATED APPLICATION

The present invention claims priority under 35 U.S.C. 119(a-d) to CN 201910919001.9, filed Sep. 26, 2019.

BACKGROUND OF THE PRESENT INVENTION

Field of Invention

The present invention relates to fields of seepage prevention and seepage isolation of infrastructures including water conservancy, buildings, landfills, etc., and more particularly it presents a pressing-pulling device, a composite slotting equipment combined static pressure and vibration of a polymer anti-seepage wall and a using method thereof.

Description of Related Arts

In recent years, the two-component polyurethane polymer grouting materials with the self-expanding property and the corresponding high-pressure injection technology thereof are developing rapidly all over the world, and they have become one of the hot topics in the field of chemical grouting. They have been widely used in reinforcement and seepage prevention of infrastructures of transportation, water conservancy, mines, buildings and so on. The nature of this method is to inject the two-component polymer material into fractures (pores) of the rock mass and by virtue of the characteristics of rapid expansion and solidification of the polymer material after chemical reaction, the rock fractures can be filled, and thus the goal of filling the gap, sealing the leakage channel and preventing and controlling the water damage can be achieved.

The application of the polymer curtain grouting technology in the water conservancy includes building the continuous ultra-thin anti-seepage wall of the body or foundation of the earth dam. Its implementation process are as the follows: according to the design requirements of the dam seepage prevention, pressing the special two-winged drilling tool into the soil with a static pressure equipment to form a series of V-shaped grouting holes at the predetermined distance along the axial direction of the dam, and the wing ends of adjacent V-shaped grouting holes should overlap with each other to form a continuous W-shaped hole; injecting the two-component non-aqueous reactive polymer slurry into each grouting hole, wherein the polymer prepolymer reacts and rapidly expands to fill the grouting holes and solidifies, thereby forming a series of ultra-thin curtain sheets, and each adjacent sheet is connected to each other at both ends to form a continuous polymer anti-seepage curtain.

The slotting equipment of the conventional cement anti-seepage wall technology can only build wide slots. The thickness of the concrete anti-seepage walls is generally greater than 20 cm. The operation of the Equipment is complicated and accuracy is difficult to control. The slurry protective wall is needed during the construction of the concrete anti-seepage wall in the body of the earth dam. If the rise speed of the concrete surface in the holes cannot be well controlled, the dam body will crack.

SUMMARY OF THE PRESENT INVENTION

To overcome the problems mentioned above, an object of the present invention is to provide a pressing-pulling device, and a composite slotting equipment combined static pressure and vibration of a polymer anti-seepage wall and a using method thereof. The whole system is highly integrated and easy to operate, making the construction process convenient. This invention can be used to solve the slotting problem when constructing the polymer anti-seepage walls.

Accordingly, in order to accomplish the above objects, the present invention provides:

a pressing-pulling device, comprising: a pressing-pulling bracket (26), on which slotting oil cylinders (23) are symmetrically and vertically installed; wherein a piston rod of the slotting oil cylinders (23) faces down; a bottom end of the piston rod is connected to a connecting plate (25) with a through-hole in a center; a continuous lifting mechanism (9) is installed in a middle of the pressing-pulling bracket (26), and a slotting rod (8) is vertically inserted into the continuous lifting mechanism (9); a lifting ring (6) is installed at a top end of the slotting rod (8); a bottom end of the slotting rod (8) extends down through the through-hole to connect to a slotting cutter (19); a locking device (24) is fixed on the connecting plate (25) near the through-hole for fixing the slotting rod (8).

The locking device (24) is an annular locking iron ring and is made of two half rings a left half iron ring and a right half iron ring; both of the two half rings are installed in the through-hole and are sleeved on the slotting rod (8); a clamping hydraulic cylinder is fixedly connected to a middle of an external sidewall of the left half iron ring and right half iron ring, respectively, and the clamping hydraulic cylinder is embedded in the connecting plate (25); the clamping hydraulic cylinder drives the left half iron ring and the right half iron ring to clamp the slotting rod (8).

The continuous lifting mechanism (9) comprises a hydraulic cylinder I (903) and a hydraulic cylinder II (904) arranged up and down; a piston of the hydraulic cylinder I (903) faces up, and an automatic jaw I (905) which extends along a radial direction of the piston of the hydraulic cylinder I (903) is installed on the piston of the hydraulic cylinder I (903); a piston of the hydraulic cylinder II (904) faces up, and an automatic jaw II (906) which extends along a radial direction of the piston of the hydraulic cylinder II (904) is installed on the piston of the hydraulic cylinder II (904); jaws are mounted at extended ends of the automatic jaw I (905) and the automatic jaw II (906), and the slotting rod (8) passes through the automatic jaw I (905) and the automatic jaw II (906) in sequence;

side faces of bottom ends of chambers of the hydraulic cylinder I (903) and the hydraulic cylinder II (904) are respectively connected to one ends of a hydraulic oil pipe I (908) and a hydraulic oil pipe II (909); the other ends of the hydraulic oil pipe I (908) and the hydraulic oil pipe II (909) are connected to an oil supply mechanism; a side face of a top end of the chamber of the hydraulic cylinder I (903) is connected to a top end of a communication oil pipe (907), and a bottom end of the communication oil pipe (907) is connected to a side face of a top end of the chamber of the hydraulic oil cylinder II (904); a limit switch I (901) is arranged above the hydraulic cylinder I (903) and a limit switch II (902) is arranged above the hydraulic cylinder II (904).

The continuous lifting mechanism (9) contains a PLC (Programmable Logic Controller) I, wherein the PLC I is electrically connected to the limit switch I (901), the limit switch II (902), the automatic jaw I (905), the automatic jaw II (906) and the oil supply mechanism respectively.

The present invention also provides a composite slotting equipment combined static pressure and vibration of a polymer anti-seepage wall, comprising: a pressing-pulling device with a vibrator (20) installed on a bottom end face of a connecting plate (25).

The composite slotting equipment combined static pressure and vibration of the polymer anti-seepage wall further comprises a body (22), wherein the pressing-pulling device is installed in a center of the body (22); a rotating base (5) is installed on one side of the body (22), and a hoist (1) is installed on the rotating base (5); the hoist (1) is connected to a hanging arm (3); a telescopic lifting arm (4) is hinged to the rotating base (5), and an end of a telescopic rod of the telescopic lifting arm (4) is hinged to the hanging arm (3); a roller is installed on a top end of the hanging arm (3); a steel wire rope (2) is wound on the hoist (1), and one end of the steel wire rope (2) hangs down around the roller and is connected with a hook (7); the hook (7) and the slotting rod (8) are vertically coaxial.

A control system (11), an electromechanical integrated box (12), an operating platform (16) and a power pump station (14) are installed on the other side of the body (22); a pushing-pulling control area, a walking control area, a hoisting control area, a power switch and an emergency stop switch are arranged on an operating panel of the control system (11).

An electronic level (27) is installed in a center of the connecting plate (25).

A counterweight (10) is mounted on the body (22), and legs (17) are symmetrically mounted on two sides of the body (22); the legs (17) extend downwardly along the body (22), and walking frames are installed inside extended ends of the legs (17); driving gears (21) are installed on two sides of the walking frames; the driving gears (21) are connected to the electromechanical integrated box (12) and are externally connected to tracks (18).

The present invention also provides a using method of a composite slotting equipment combined static pressure and vibration of a polymer anti-seepage wall, comprising steps of:

I, reaching a working platform of a body (22) by a ladder installed and connecting an external power source to an electromechanical integrated box (12);

II, turning on a power switch on a control system (11) to start a power pump station (14);

III, turning on walking control buttons on the control system (11) so that the composite slotting equipment combined static pressure and vibration of the polymer anti-seepage wall is removed to a predetermined working position;

IV, adjusting an angle of a hanging arm (3) by moving a rotating base (5) until a hook (7) is close to a slotting rod (8); manually connecting a lifting ring (6) on the slotting rod (8) to the hook (7) at an end of a steel wire rope (2), and then lifting the slotting rod (8) by a hoist (1), through which the slotting rod (8) is inserted into a pressing-pull device and continuous to extend downward along the pressing-pulling device; since the slotting rod (8) hangs down naturally, it can be adjusted to vertical by gravity; then connecting a bottom end of the slotting rod (8) to a slotting cutter (19);

V, turning on a leveling button on the control system (11) for adjusting lengths of legs (17), so that levelness of the composite slotting equipment combined static pressure and vibration of the polymer anti-seepage wall is adjusted to level;

VI, turning on a push-in button and then a vibration button to press the sheet-shaped slotting cutter (19) into soil to a predetermined depth, and then turning on a pushing-pulling control button to pull the slotting cutter (19) out off the soil at a uniform speed; and VII, moving the composite slotting equipment combined static pressure and vibration of the polymer anti-seepage wall to a next working position and repeating the steps I-VI for slotting, so as to build anti-seepage wall slots.

Compared with the prior art, the advantages of the present invention are as follows.

1. the slots built with the method presented in this invention are with thickness of 2-5 cm, and thus thin slots can be built in the dam body. Furthermore, the slotting process is conducted in a dry environment and it does not require the use of slurry protective wall; this invention brings no damage to the dam body caused by excessive slotting, and to conventional cement anti-seepage wall slurry protective walls or other water damages.

2. the connection between the adjacent wall sections or piles of the conventional cement anti-seepage walls is a difficulty in the traditional anti-seepage wall construction technology and the connection interfaces are usually designed as flat. In the present invention, the overlaps side columns with sleeve holes was used, which works effective to solves the problems of the loose connection of conventional anti-seepage walls and leakage.

3. The present invention adopts the integrated walking frames, on which the driving gears are respectively installed on each side. The driving gears are connected to a driving motor and tare externally connected to the tracks. Compared with the walking-pedrail and manual movement of the conventional slotting equipment, the present invention can be used in various working conditions.

4. Furthermore, the pressing-pulling device of the present invention integrates the electronic level and adopts angle and graphic digital display, wherein the measurement is accurate, fast and reliable. Four azimuth icons indicate the measurement angle (X/Y axis), and a sound prompt is provided at 0-90° or specified angles. X/Y axis is synchronously measured with a resolution as high as 0.1° and the highest accuracy of ±0.05°, so as to be stable and accurate during slotting.

5. The device of the present invention integrates static pressure and vibration together to adapt to complicated soil conditions and integrates a hoisting system, the pressure-pulling device and the control system to achieve a high degree of integration, and it is easy to operate and makes the construction process to be easier, showing a broad market prospects.

ELEMENT REFERENCE

1—hoist, 2—steel wire rope, 3—hanging arm, 4—telescopic lifting arm, 5—rotating base, 6—lifting ring, 7—hook, 8—slotting rod, 9—continuous lifting mechanism, 10—counterweight, 11—control system, 12—electromechanical integrated box, 13—hanging arm support, 14—power pump station, 15—ladder, 16—operating platform, 17—leg, 18—track, 19—slotting cutter, 20—vibrator, 21—driving gear, 22—body, 23—slotting oil cylinder, 24—locking device, 25—connecting plate, 26—pressing-pulling bracket; 27—electronic level, 28—walking frame; 901—limit switch I, 902—limit switch II, 903—hydraulic cylinder I, 904—hydraulic cylinder II, 905—automatic jaw I, 906—automatic jaw II, 907—communication oil pipe, 908—hydraulic oil pipe I, 909—hydraulic oil pipe II.

DETAILED DESCRIPTION OF THE PREFERRED EMBODIMENT

Figure 2:
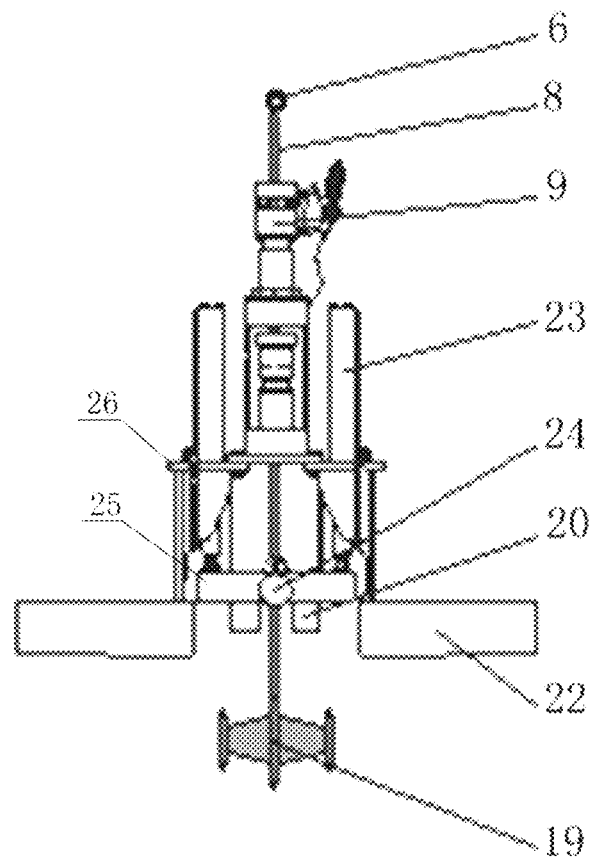
FIG. 2 is a structural view of a pressing-pulling device.

Referring to FIG. 2, a pressing-pulling device is shown, comprising: a pressing-pulling bracket 26, wherein two or four slotting oil cylinders 23 are symmetrically and vertically mounted on the pressing-pulling bracket 26, and a piston rod of each of the slotting oil cylinders 23 faces downwardly; a bottom end of the piston rod is connected to a connecting plate 25, and a through hole is provided in a middle of the connecting plate 25; a continuous lifting mechanism 9 is installed in a middle of the pressing-pulling bracket 26, and a slotting rod 8 is vertically inserted into the continuous lifting mechanism 9, wherein a diameter of the through hole is larger than a radial size of the slotting rod 8; a lifting ring 6 is installed at a top end of the slotting rod 8; a bottom end of the slotting rod 8 extends downwardly through the through hole to connect to a slotting cutter 19, wherein the slotting cutter 19 is connected to the bottom end of the slotting rod 8 through socket or screw thread; a locking device 24 is fixed on the connecting plate 25 near the through hole for fixing the slotting rod 8. The slotting cutter 19 is sheet-shaped as a whole, which is well-known in the art and will not be further described here.

Preferably, the locking device 24 is an annular locking iron ring, which is divided into a left half iron ring (not labeled in the drawings) and a right half iron ring (not labeled in the drawings), both installed in the through-hole and sleeved on the slotting rod 8; a clamping hydraulic cylinder (not labeled in the drawings) is fixedly connected to a middle of an external sidewall of the left half iron ring and right half iron ring respectively, and the clamping hydraulic cylinder is embedded in the connecting plate 25; the clamping hydraulic cylinder drives the left half iron ring and the right half iron ring to clamp the slotting rod 8. The annular locking iron ring is customized according to a diameter of the slotting rod 8, wherein an internal diameter of the annular locking iron ring is slightly larger than the diameter of the slotting rod 8.

Figure 4:
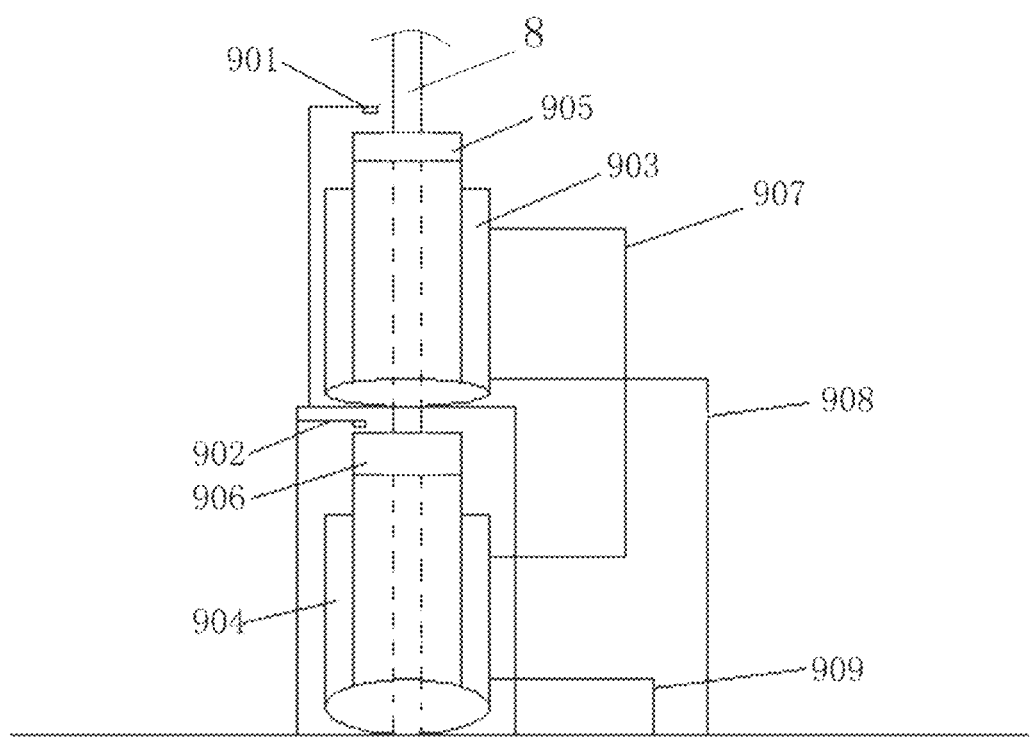
FIG. 4 is a structural view of a continuous lifting mechanism.

Preferably, referring to FIG. 4, the continuous lifting mechanism 9 comprises a hydraulic cylinder I 903 and a hydraulic cylinder II 904 arranged up and down; a piston of the hydraulic cylinder I 903 faces upwardly, and an automatic jaw I 905 is installed on the piston of the hydraulic cylinder I 903 and extends along a radial direction of the piston of the hydraulic cylinder I 903; a piston of the hydraulic cylinder II 904 faces upwardly, and an automatic jaw II 906 is installed on the piston of the hydraulic cylinder II 904 and extends alone a radial direction of the piston of the hydraulic cylinder II 904; wherein the radial direction is perpendicular to an axis of the hydraulic cylinder; jaws are mounted at extended ends of the automatic jaw I 905 and the automatic jaw II 906, and the slotting rod 8 passes through the jaws of the automatic jaw I 905 and the automatic jaw II 906 in sequence; the automatic jaws are customized and produced according to the diameter of the slotting rod 8, which is well-known in the art and will not be further described here.

Side faces of bottom ends of chambers of the hydraulic cylinder I 903 and the hydraulic cylinder II 904 are respectively connected to one ends of a hydraulic oil pipe I 908 and a hydraulic oil pipe II 909, wherein the chambers are conventional oil chambers of oil cylinders; the other ends of the hydraulic oil pipe I 908 and the hydraulic oil pipe II 909 is connected to an oil supply mechanism, wherein the oil supply mechanism is connected to an electromechanical integrated box 12 and buttons in a pushing-pulling control area of a control panel through wires; the oil supply mechanism is well-known for controlling oil input and output; a side face of a top end of the chamber of the hydraulic cylinder I 903 is connected to a top end of a communication oil pipe 907, a bottom end of the communication oil pipe 907 is connected to a side face of a top end of the chamber of the hydraulic oil cylinder II 904; a limit switch I 901 is arranged above the hydraulic cylinder I 903 and a limit switch II 902 is arranged above the hydraulic cylinder II 904.

Preferably, the continuous lifting mechanism 9 further comprises a PLC I, wherein the PLC I is electrically connected to the limit switch I 901, the limit switch II 902, the automatic jaw I 905, the automatic jaw II 906 and the oil supply mechanism respectively. The PLC I is connected to the control system 11 through a line. The control system 11 is well-known in the art and will not be further described here.

Figure 1:
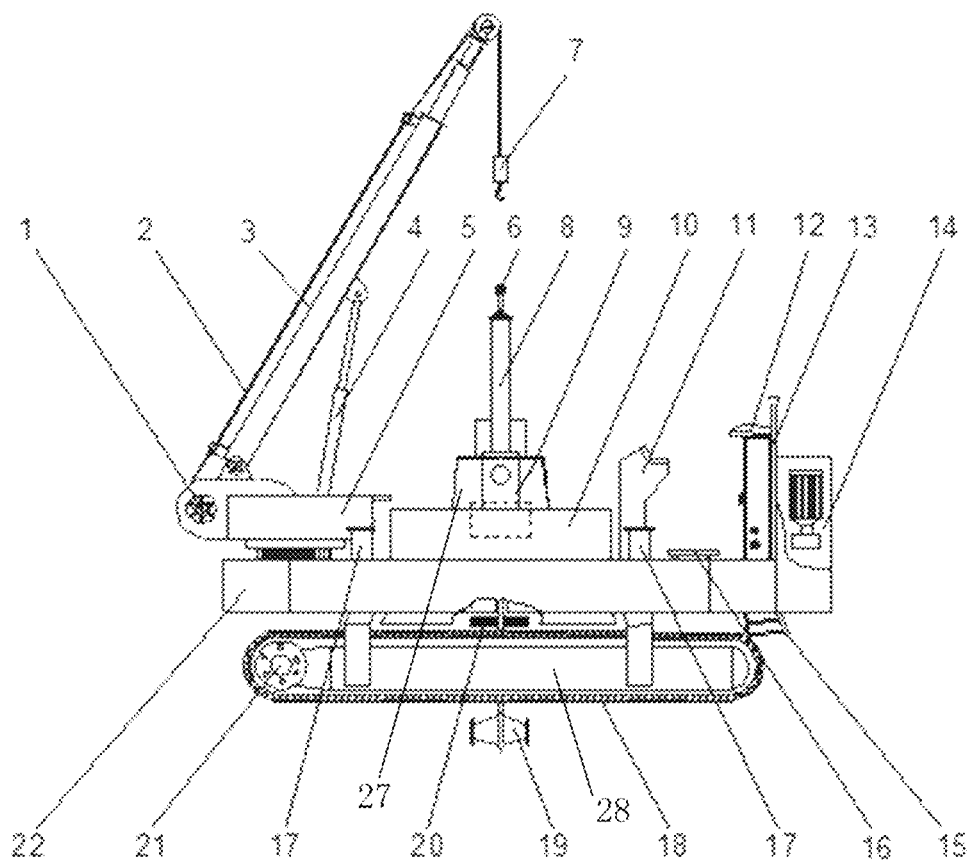
FIG. 1 is a structural view of the present invention.

The present invention also provides a composite slotting equipment combined static pressure and vibration of a polymer anti-seepage wall as shown in FIG. 1, comprising: a pressing-pulling device with two symmetrically arranged vibrators 20 installed on a bottom end face of a connecting plate 25.

Preferably, the composite slotting equipment combined static pressure and vibration of the polymer anti-seepage wall further comprises a body 22, wherein the pressing-pulling device is installed in a middle of the body 22; a rotating base 5 is installed on one side of the body 22, and a hoist 1 is installed on the rotating base 5; the hoist 1 is connected to a hanging arm 3; a telescopic lifting arm 4 is hinged to the rotating base 5, and an end of a telescopic rod of the telescopic lifting arm 4 is hinged to the hanging arm 3; a roller (not labeled in the drawings) installed on a top end of the hanging arm 3; a steel wire rope 2 is wound on the hoist 1, and an end of the steel wire rope 2 naturally hangs down around the roller and is connected with a hook 7; the hook 7 and the slotting rod 8 are vertically coaxial.

Preferably, a control system 11, an electromechanical integrated box 12, an operating platform 16 and a power pump station 14 are installed on the other side of the body 22; the power pump station 14 provides power for the electromechanical integrated box 12, and the electromechanical integrated box is also connected to an external power source.

Preferably, the operating platform 16 is specially provided on the body 22 for a worker to stand on to operate the control system 11.

Figure 3:
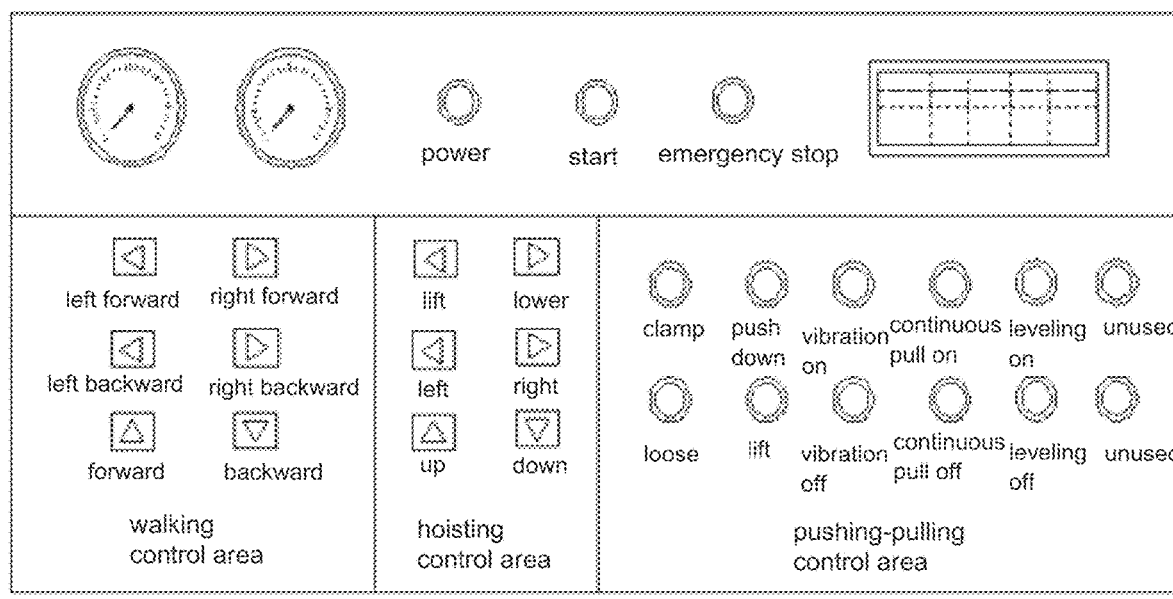
FIG. 3 is a structural view of a control panel.

In order to facilitate automatic control, as shown in FIG. 3, a pushing-pulling control area, a walking control area, a hoisting control area, a power switch and an emergency stop switch are arranged on an operating panel of the control system 11. The pushing-pulling control area comprises clamp, loose, lift, push-down, vibration on, vibration off, continuous pull on, continuous pull off, leveling on and leveling off buttons for controlling the pressing-pulling device and the electronic level, wherein the clamp and loose buttons are used to control the locking device 24, the vibration on and off buttons are used to control the vibrator 20, the continuous pull on and off buttons are used to control the continuous lifting mechanism 9, and the leveling on and off buttons are used to control the electronic level 27. The hoisting control area comprises lift, lower, left, right, up and down buttons for controlling the hoist 1. The walking control area comprises left forward, right forward, left backward, right backward, forward and backward buttons for controlling walking of the whole equipment, as shown in FIG. 3 in detail.

In order to facilitate adjustment of the level of the whole equipment, an electronic level 27 is installed in the middle of the connecting plate 25, which is a two-axis column electronic level and well-known in the art. The electronic level 27 adopts angle and graphic digital display, wherein measurement is accurate, fast and reliable. Four azimuth icons indicate the measurement angle (X/Y axis), and a sound prompt is provided at 0-90° or specified angles. A measuring range of the two-axis column electronic level is 0-90°. X/Y axis is synchronously measured with a resolution as high as 0.1° and the highest accuracy of ±0.05°.

In order to work on road with complex working conditions, a counterweight 10 is mounted on the body 22, and legs 17 are symmetrically mounted on two sides of the body 22 by screw threads, wherein a height of the body 22 can be adjusted by manually turning the legs 17, so as to adjust the level; the legs 17 extend downwardly along the body 22, and walking frames 28 are installed inside extended ends of the legs 17; driving gears 21 are installed on two sides of the walking frames; the driving gears 21 are connected to the electromechanical integrated box 12, and are externally connected to tracks 18. Through the left forward, right forward, left backward, right backward, forward and backward buttons of the walking control area, walking of the entire equipment can be controlled.

Working processes of the above-mentioned pressing-pulling device are as follows.

A working process of pressing the slotting cutter 19 to a predetermined depth in soil is as follows: by operating the clamp button, piston rods the clamping hydraulic cylinders are driven by the two horizontal arranged clamping hydraulic cylinders, and simultaneously drive the left and right half iron rings to clamp the slotting rod 8; meanwhile, the automatic jaws I 905 and II 906 are opened; the slotting oil cylinder 23 is used to push the connecting plate 25, so as to press the slotting rod 8 and the slotting cutter 19 downwards, in such a manner that the sheet-shaped slotting cutter 19 cuts into the soil; when there are hard particles that cannot be cut, the vibrator 20 is turned on to drive the slotting rod 8 and the sheet-shaped slotting cutter 19 to move the hard particles, so as to form a channel and press the sheet-shaped slotting cutter 19 to a predetermined depth in the soil;

for pulling the slotting rod 8 and the sheet-shaped slotting cutter 19 out, the continuous pull button is turned on so that the oil supply mechanism continues to supply oil; when the hydraulic oil pipe II 909 continues to get oil, a piston rod of the hydraulic cylinder II 904 moves up and drives the automatic jaw II 906 to move up; when the oil quantity reaches a certain height, oil is supplied to the hydraulic cylinder I 903 through the communication oil pipe 907, wherein a piston rod of the hydraulic cylinder I 903 drives the automatic jaw I 905 to move down; when the automatic jaw II 906 reaches the limit switch II 902, the hydraulic oil pipe 1908 starts to supply oil, and the hydraulic oil pipe II 909 stops supplying oil, wherein the piston rod of the hydraulic oil cylinder I 903 drives the automatic jaw I 905 to move up, and the piston rod of the hydraulic oil cylinder II 904 drives the automatic jaw II 906 to move down; when the automatic jaw I 905 reaches the limit switch 1901, the hydraulic oil pipe 1908 stops supplying oil, and the hydraulic oil pipe II 909 starts to supply oil again; the hydraulic oil pipe 1908 and the hydraulic oil pipe II 909 are connected through a solenoid valve, and are alternately supplied through a relay, in such a manner that the slotting rod 8 is alternately moved up and down at an uniform speed as the two automatic jaws work; a pull-out speed can also be adjusted by adjusting oil supply quantity; the hydraulic oil pipe I 908 and the hydraulic oil pipe II 909 are pressure-resistant hoses.

The present invention also provides a using method of a composite slotting equipment combined static pressure and vibration of a polymer anti-seepage wall; comprising steps of:

I, reaching a working platform of a body 22 through a ladder installed on the body 22, and connecting an external power source to an electromechanical integrated box 12;

II, operating a power switch on a control system 11 to turn on a power pump station 14;

III, operating walking control buttons on the control system 11 to move the composite slotting equipment combined static pressure and vibration of the polymer anti-seepage wall to a predetermined working position;

IV, adjusting an angle of a hanging arm 3 by moving a rotating base 5 until a hook 7 is close to a slotting rod 8; manually connecting a lifting ring 6 of the slotting rod 8 to the hook 7 at an end of a steel wire rope 2, and then lifting the slotting rod 8 by a hoist 1, in such a manner that the slotting rod 8 is inserted into a pressing-pull device and downwardly passes through the pressing-pulling device to naturally hang down and adjust verticality; then connecting a bottom end of the slotting rod 8 to a slotting cutter 19;

V, operating a leveling button on the control system 11 for adjusting heights of legs 17, so as to adjust level of the composite slotting equipment combined static pressure and vibration of the polymer anti-seepage wall;

VI, operating a push-in button and a vibration button in sequence to press the sheet-shaped slotting cutter 19 to a predetermined depth of soil, and then operating a pushing-pulling control button to pull the slotting cutter 19 out off the soil at a uniform speed; and VII, moving the composite slotting equipment combined static pressure and vibration of the polymer anti-seepage wall to a next working position and repeating the steps I-VI for slotting, so as to form anti-seepage wall slots.

The above is only a preferred embodiment of the present invention. Those skilled in the art may apply several changes and improvements without departing from such principles. Therefore, this invention includes all modifications encompassed within the spirit, as such modifications will not affect the effectiveness of the implementation of the present invention and the practicability of the patent.

What is claimed is:

1. A pressing-pulling device, comprising: a pressing-pulling bracket (26), on which slotting oil cylinders (23) are symmetrically and vertically installed; wherein a piston rod of the slotting oil cylinders (23) faces down; a bottom end of the piston rod is connected to a connecting plate (25) with a through-hole in a center; a continuous lifting mechanism (9) is installed in a middle of the pressing-pulling bracket (26), and a slotting rod (8) is vertically inserted into the continuous lifting mechanism (9); a lifting ring (6) is installed at a top end of the slotting rod (8); a bottom end of the slotting rod (8) extends down through the through-hole to connect to a slotting cutter (19); a locking device (24) is fixed on the connecting plate (25) near the through-hole for fixing the slotting rod (8).

2. The pressing-pulling device, as recited in claim 1, wherein the locking device (24) is an annular locking iron ring and is made of two half rings a left half iron ring and a right half iron ring; both of the two half rings are installed in the through-hole and are sleeved on the slotting rod (8); a clamping hydraulic cylinder is fixedly connected to a middle of an external sidewall of the left half iron ring and right half iron ring, respectively, and the clamping hydraulic cylinder is embedded in the connecting plate (25); the clamping hydraulic cylinder drives the left half iron ring and the right half iron ring to clamp the slotting rod (8).

3. The pressing-pulling device, as recited in claim 1, wherein the continuous lifting mechanism (9) comprises a hydraulic cylinder I (903) and a hydraulic cylinder II (904) arranged up and down; a piston of the hydraulic cylinder I (903) faces up, and an automatic jaw I (905) which extends along a radial direction of the piston of the hydraulic cylinder I (903) is installed on the piston of the hydraulic cylinder I (903); a piston of the hydraulic cylinder II (904) faces up, and an automatic jaw II (906) which extends along a radial direction of the piston of the hydraulic cylinder II (904) is installed on the piston of the hydraulic cylinder II (904); jaws are mounted at extended ends of the automatic jaw I (905) and the automatic jaw II (906), and the slotting rod (8) passes through the automatic jaw I (905) and the automatic jaw II (906) in sequence;

side faces of bottom ends of chambers of the hydraulic cylinder I (903) and the hydraulic cylinder II (904) are respectively connected to one ends of a hydraulic oil pipe I (908) and a hydraulic oil pipe II (909); the other ends of the hydraulic oil pipe I (908) and the hydraulic oil pipe II (909) are connected to an oil supply mechanism; a side face of a top end of the chamber of the hydraulic cylinder I (903) is connected to a top end of a communication oil pipe (907), and a bottom end of the communication oil pipe (907) is connected to a side face of a top end of the chamber of the hydraulic oil cylinder II (904); a limit switch I (901) is arranged above the hydraulic cylinder I (903) and a limit switch II (902) is arranged above the hydraulic cylinder II (904).

4. The pressing-pulling device, as recited in claim 3, wherein the continuous lifting mechanism (9) contains a PLC (Programmable Logic Controller) I, wherein the PLC I is electrically connected to the limit switch I (901), the limit switch II (902), the automatic jaw I (905), the automatic jaw II (906) and the oil supply mechanism respectively.

5. A polymer anti-seepage wall static pressure vibration composite slotting equipment, comprising: a pressing-pulling device with a vibrator (20) installed on a bottom end face of a connecting plate (25), and a body (22), wherein the pressing-pulling device is installed in a center of the body (22); a rotating base (5) is installed on one side of the body (22), and a hoist (1) is installed on the rotating base (5); the hoist (1) is connected to a hanging arm (3); a telescopic lifting arm (4) is hinged to the rotating base (5), and an end of a telescopic rod of the telescopic lifting arm (4) is hinged to the hanging arm (3); a roller is installed on a top end of the hanging arm (3); a steel wire rope (2) is wound on the hoist (1), and one end of the steel wire rope (2) hangs down around the roller and is connected with a hook (7); the hook (7) and the slotting rod (8) are vertically coaxial.

6. The polymer anti-seepage wall static pressure vibration composite slotting equipment, as recited in claim 5, wherein a control system (11), an electromechanical integrated box (12), an operating platform (16) and a power pump station (14) are installed on the other side of the body (22); a pushing-pulling control area, a walking control area, a hoisting control area, a power switch and an emergency stop switch are arranged on an operating panel of the control system (11).

7. The polymer anti-seepage wall static pressure vibration composite slotting equipment, as recited in claim 6, wherein an electronic level (27) is installed in the center of the connecting plate (25).

8. The polymer anti-seepage wall static pressure vibration composite slotting equipment, as recited in claim 5, wherein a counterweight (10) is mounted on the body (22), and legs (17) are symmetrically mounted on two sides of the body (22); the legs (17) extend downwardly along the body (22), and walking frames are installed inside extended ends of the legs (17); driving gears (21) are installed on two sides of the walking frames; the driving gears (21) are connected to the electromechanical integrated box (12), and are externally connected to tracks (18).

9. A method of using a polymer anti-seepage wall static pressure vibration composite slotting equipment, comprising steps of:

I, reaching a working platform of a body (22) by a ladder installed and connecting an external power source to an electromechanical integrated box (12);

II, turning on a power switch on a control system (11) to start a power pump station (14);

III, turning on walking control buttons on the control system (11) so that the polymer anti-seepage wall static pressure vibration composite slotting equipment is moved a predetermined working position;

IV, adjusting an angle of a hanging arm (3) by moving a rotating base (5) until a hook (7) is close to a slotting rod (8); manually connecting a lifting ring (6) on the slotting rod (8) to the hook (7) at an end of a steel wire rope (2), and then lifting the slotting rod (8) by a hoist (1), through which the slotting rod (8) is inserted into a pressing-pull device and continuous to extend downward along the pressing-pulling device; since the slotting rod (8) hangs down naturally, it can be adjusted to vertical by gravity; then connecting a bottom end of the slotting rod (8) to a slotting cutter (19);

V, turning on a leveling button on the control system (11) for adjusting lengths of legs (17), so that levelness of the polymer anti-seepage wall static pressure vibration composite slotting equipment is adjusted to level;

VI, turning on a push-in button and then a vibration button to press the sheet-shaped slotting cutter (19) into soil to a predetermined depth, and then turning on a pushing-pulling control button to pull the slotting cutter (19) out off the soil at a uniform speed; and VII, moving the polymer anti-seepage wall static pressure vibration composite slotting equipment to a next working position and repeating the steps I-VI for slotting, so as to build anti-seepage wall slots.

* * * * *